Patented Jan. 23, 1923.

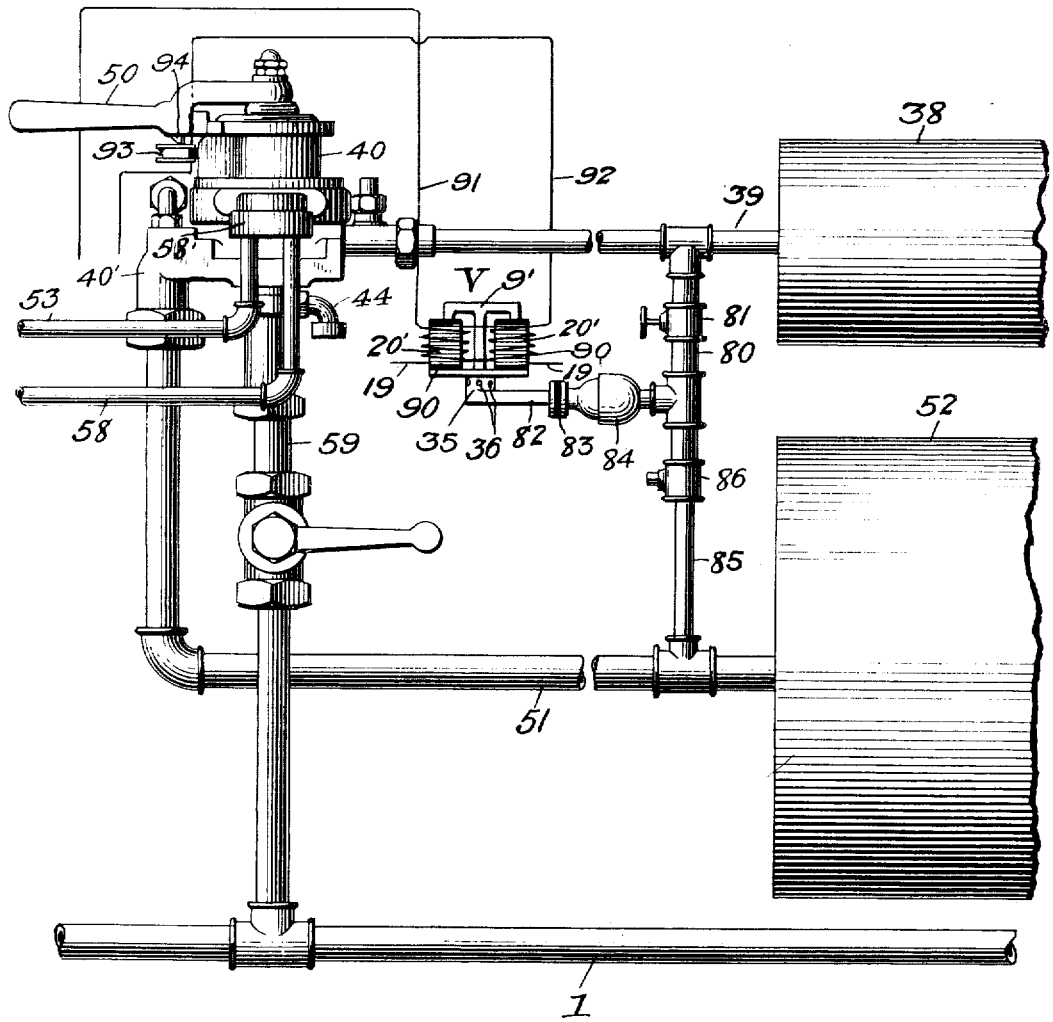

1,442,853

UNITED STATES PATENT OFFICE.

JOSEPH W. BUELL, OF WASHINGTON, DISTRICT OF COLUMBIA; WANDA A. BUELL EXECUTRIX OF THE ESTATE OF SAID JOSEPH W. BUELL, DECEASED.

COMBINED AUTOMATIC TRAIN SIGNALING AND CONTROL SYSTEM.

Application filed May 4, 1922. Serial No. 558,366.

*To all whom it may concern:*

Be it known that I, JOSEPH W. BUELL, a citizen of the United States, residing at the city of Washington, in the District of Columbia, have invented certain new and useful Improvements in Combined Automatic Train Signaling and Control Systems; and I do hereby declare the following to be a full, clear, and exact description of the invention, such as will enable others skilled in the art to which it appertains to make and use the same.

The invention relates to certain improvements in combined railway signaling and automatic control systems, in which a signal is operated and the air brakes are set when the locomotive or the train encounters danger conditions on the track, said system including an electro-magnetically controlled valve for releasing the pressure from the equalizing reservoir of the air brake system, thereby applying the brakes. In systems of this general character, a typical example of which is that disclosed in my prior Reissue Patent No. 14,676, dated June 24, 1919, it was found necessary to apply an automatic cut-off or blanking valve to cut off the pressure from the main reservoir simultaneously with the operation of the release valve connected with the equalizing reservoir, when the engineer's valve is in running position, to prevent the air pressure in the main reservoir maintaining the supply of air in the auxiliary reservoir and the train pipe, so that the electro-magnetically controlled valve could effectively vent the equalizing reservoir and the train pipe and apply the brakes. The interposition of this blanking valve introduced objectionable complications in the system, and the present invention is designed to avoid the necessity of the blanking valve aforesaid, by providing a simple connection for effecting a reduction of the air pressure in the main pressure system of the air brake apparatus, preferably by a partial bleeding or reduction of the pressure in the main reservoir, simultaneously with the operation of the automatically operated release valve connected with the equalizing reservoir, so that the predominant pressure in the main reservoir will not pass to the top of the control piston of the engineer's valve, the auxiliary reservoir and the train pipe and thereby prevent operation of the brakes.

A further difficulty in the normal operation of systems of the character described arises from the fact that it not infrequently occurs that the engineer will attempt to apply the air brakes by operating the engineer's valve simultaneously with or previous to the actuation of the automatic electro-magnetically controlled release valve connected with the equalizing reservoir, when the train has encountered danger conditions on the track, with the result that the brakes are applied too violently with the probability of damage to the equipment. In order to avoid this condition, the invention contemplates the provision of means for preventing the operation of the electro-magnetically actuated release valve when the engineer's valve has been moved to service position, said means preferably comprising an electric circuit including coils on the magnet of the automatic release valve which operate to hold the valve closed so long as said coils are energized, said electric circuit deriving its power from any suitable source of electric energy, preferably the main battery carried by the locomotive, and including a circuit closer which is operated by the engineer's valve when the latter is moved to service position, said circuit closer remaining open when the engineer's valve is in running position.

The invention is illustrated in the accompanying drawing, in which the figure is a partial diagrammatic view of a system similar to that shown and described in the reissue patent aforesaid.

It will be understood that while the instant invention is shown as applied to a combined automatic train signaling and control system of the same general character as that shown in Reissue Patent No. 14,676 aforesaid, it is in no sense limited to this particular system, but is applicable to all similar systems in which the air brakes are actuated by the release of pressure in the system by means of an electro-magnetically controlled valve, which valve is automatically opened when the locomotive or train encounters danger conditions on the track. For convenience in describing the apparatus, the same reference characters have been applied to similar parts of the apparatus as in the reissue patent aforesaid.

Referring to the drawing, 1 indicates a section of the train pipe which is connected by pipe 59 with the engineer's valve 40, which latter in turn is connected by pipe 51 with a main reservoir 52, and by pipe 39 with the auxiliary reservoir 38, the other adjuncts of the standard air brake equipment being omitted to avoid complication. Connected with the pipe 39 from the equalizing reservoir is a pipe 80 provided with a suitable valve 81 and having a lateral branch 82 on the end of which is secured the valve casing 35 of the release valve V, said casing being provided with venting openings 36. Preferably the pipe 82 is provided with an insulating coupling 83 to prevent accidental grounding of the operating circuits through the piping, and also with a strainer 84. It will be noted that the release valve V occupies the same operative relation with respect to the equalizing reservoir 38 as in said reissue patent, but for convenience of installation has been mounted on a pipe connected directly with the equalizing reservoir, instead of to the body of the latter. Said valve V is in all respects similar to that illustrated in the reissue patent aforesaid, including the armature 9' to which the needle valve proper is attached, said armature having the lateral pendant arms projecting into the cores of the magnet coils 20', 20', which coils are included in the electric circuit which controls the operation of the release valve, the elements of said circuit being represented by the leads 19, 19.

As thus far described, the apparatus would operate substantially like that shown in the reissue patent aforesaid upon the locomotive encountering danger conditions on the track, the electric current flowing in the coils 20', 20', would be interrupted and the valve holding magnet would be de-energized, thereby liberating the valve which would be blown off its seat by the air pressure and vent the equalizing reservoir through pipes 39, 80, 82 and the openings 36 in the valve casing 35, which would result in the application of the air brakes.

As heretofore explained, a prerequisite to the operation of the valve V to vent the equalizing reservoir and apply the brakes when the engineer's valve 40 was in running position, was to provide an automatic shut-off or blanking valve to cut off the flow of air from the main reservoir 52 to the train pipe while the latter was being vented through the equalizing reservoir and the automatic release valve V. This arrangement gave rise to certain difficulties and objections, both as to the cost of installation of the blanking valve and the successful operation thereof, and in order to avoid these defects and objections, and to wholly dispense with the blanking valve, the present invention provides means for effecting a partial reduction of the pressure in the main reservoir by a bleeding operation, simultaneously with the actuation of the valve V to vent the equalizing reservoir 38, thereby preventing the air pressure from the main reservoir being transmitted to the upper side of the piston of the engineer's valve, the train pipe and the equalizing reservoir, which would prevent the actuation of the brakes. A relatively slight reduction of bleeding of the pressure from the main reservoir is found to be entirely effective, and to produce this result, a pipe 85 is connected between the pipe 51 from the main reservoir and the pipe 80 leading from the equalizing reservoir, and is therefore in direct connection with the release valve V. The said pipe 85 is preferably provided with a regulating valve 86, which may be accurately adjusted to effect the desired degree of reduction of the pressure in the main reservoir when the valve V is opened. Said valve 86 is preferably of the lock type, so that when it has once been set, it cannot be changed without unlocking it. Under certain conditions, it may be found unnecessary to vary the extent of bleeding or reduction of pressure from the main reservoir, in which event the pipe 85 may be of a sufficient diameter to effect the bleeding operation without the interposition of a regulating valve 86. When the electro-magnet of the valve V is de-energized by the locomotive encountering danger conditions on the track, the valve is opened, thereby venting the equalizing reservoir and the train pipe and applying the brakes. Under normal conditions of operation, the engineer's valve 40 would be in running position, in which condition the pressure from the main reservoir would be transmitted to the train pipe and prevent the setting of the brakes, unless special means, such as the blanking valve described in the reissue patent aforesaid, were employed to shut off this pressure from the main reservoir. It has been found, however, that by providing a connection between the main reservoir and the release valve V, which will effect a partial reduction of pressure in the main reservoir, simultaneously with the venting of the equalizing reservoir by the opening of said valve V, the automatic cut-off or blanking valve may be dispensed with, and the pressure from the main reservoir will no longer pass to the train pipe and prevent the proper setting of the brakes, but the latter operation will be effected gradually by the venting of the equalizing reservoir and the train pipe through the valve V.

Should the engineer attempt to anticipate the automatic operation of the release valve V as the locomotive approaches a danger condition on the track, and manually apply the brakes by throwing the lever of the engineer's valve to service position, it is obvious that the subsequent opening of the valve V by the operation of the automatic control system would produce a too rapid venting of the train pipe and a consequent violent application of the brakes, with the attendant danger of damage to the equipment and the possible derailment of the vehicle or train, and great discomfort to the passengers. In order to avoid this contingency, and nevertheless to permit the discretionary setting of the brakes by the engineer when he observes danger conditions, special means are provided for preventing the operation of the automatic release valve V when the engineer's valve has been moved to service position, said means including an electric circuit represented by leads 91 and 92, connected with a suitable source of power, which may be conveniently the main battery carried by the locomotive or other vehicle, and the two coils 90, 90, superposed on the coils 20', 20', of the actuating magnet of the valve V, which coils 90, 90, when energized, serve to retain the valve V in closed position. The circuit to the auxiliary coils 90, 90, is closed only when the engineer's brake valve has been moved to service position, and convenient means for effecting this closure comprises a normally open circuit closer 93, interposed in the lead 92 and mounted on the casing of the engineer's valve, the contacts of said circuit closer being forced into engagement by a lug or similar projection 94 on the handle of the engineer's valve.

It will be seen that under normal running conditions, when the engineer's valve is in running position, the circuit through the auxiliary coils 90, 90, of the release valve magnet is broken by the separation of the contacts of the circuit closer 93, so that the normal automatic operation of the valve V will be effected whenever danger conditions are encountered, and the auxiliary coils will have no effect on the operation of the release valve V. Should the engineer, however, move the engineer's valve to service position, either previous to or simultaneously with the de-energization of the coils 20', 20', of the release valve V, the auxiliary coils 90, 90, will be energized and hold the valve in closed position, and thereby prevent the violent application of the brakes by preventing the double venting of the train pipe.

What I claim is:

1. In an automatic train control system including an electro-magnetically controlled valve for releasing the pressure from the equalizing reservoir of the air brake system, means for simultaneously effecting a partial reduction of pressure in the main pressure system with the release of air from the equalizing reservoir.

2. In an automatic train control system including an electro-magnetically controlled valve for releasing the pressure from the equalizing reservoir of the air brake system, a connection between said valve and the main air pressure system for effecting a partial reduction of pressure in the latter simultaneously with the release of air from the equalizing reservoir.

3. In an automatic train control system including an electro-magnetically controlled valve for releasing the pressure from the equalizing reservoir of the air brake system, a restricted connection between the main reservoir and said valve for effecting a partial reduction of pressure in the main reservoir simultaneously with the release of air from the equalizing reservoir.

4. In an automatic train control system including an electro-magnetically controlled valve for releasing the pressure from the equalizing reservoir of the air brake system, a pipe connection between said valve and the main reservoir, and a regulating valve in said pipe connection, whereby a predetermined partial reduction of pressure in the main reservoir may be effected simultaneously with the release of air from the equalizing reservoir.

5. In an automatic train control system including an electro-magnetically controlled valve for releasing the pressure from the equalizing reservoir of the air brake system, means for simultaneously effecting a partial reduction of pressure in the main pressure system with the release of air from the equalizing reservoir, and means for preventing the operation of said valve when the engineer's valve is moved to service position.

6. In an automatic train control system including an electro-magnetically controlled valve for releasing the pressure from the equalizing reservoir of the air brake system, means for simultaneously effecting a partial reduction of pressure in the main pressure system with the release of air from the equalizing reservoir, and means controlled by the engineer's valve for preventing the operation of the electro-magnetic release valve when the engineer's valve is moved to service position.

7. In an automatic train control system including an electro-magnetically controlled valve for releasing the pressure from the equalizing reservoir of the air brake system, means for simultaneously effecting a partial reduction of pressure in the main pressure system with the release of air from the equalizing reservoir, and an electric circuit including supplementary coils on the magnetically controlled valve for preventing the operation of said valve when the engineer's valve is moved to service position.

8. In an automatic train control system including an electro-magnetically controlled valve for releasing the pressure from the equalizing reservoir of the air brake system, an auxiliary electric circuit including supplementary coils on the magnet of the release valve and means for closing said auxiliary electric circuit when the engineer's valve is moved to service position, whereby the operation of the release valve is prevented.

9. In an automatic train control system including an electro-magnetically controlled valve for releasing the pressure from the equalizing reservoir of the air brake system, an auxiliary electric circuit including supplementary coils on the magnet of the release valve and a circuit closer operated by the engineer's valve when the latter is moved to service position, whereby the operation of the release valve is prevented.

10. In an automatic train control system including an electro-magnetically controlled valve for releasing the pressure from the equalizing reservoir of the air brake system, an auxiliary electric circuit including supplementary coils on the magnet of the release valve and a circuit closer mounted adjacent the engineer's valve, and an abutment on the handle of the engineer's valve to actuate the circuit closer when said valve is moved to service position, whereby the operation of the release valve is prevented.

In testimony whereof I affix my signature.

JOSEPH W. BUELL.